US006407357B1

(12) United States Patent
Bellino et al.

(10) Patent No.: US 6,407,357 B1
(45) Date of Patent: Jun. 18, 2002

(54) METHOD OF RESISTANCE PROJECTION WELDING SENSORS

(75) Inventors: Joseph P. Bellino, Simsbury, CT (US); Robert R. Leclair, Lewiston, ME (US)

(73) Assignee: General Electric Company, Schenectady, NY (US)

( * ) Notice: Subject to any disclaimer, the term of this patent is extended or adjusted under 35 U.S.C. 154(b) by 21 days.

(21) Appl. No.: 09/630,230

(22) Filed: Aug. 1, 2000

Related U.S. Application Data

(60) Provisional application No. 60/189,530, filed on Mar. 15, 2000.

(51) Int. Cl.[7] ................................................ B23K 11/14

(52) U.S. Cl. .......................................... 219/93; 219/107

(58) Field of Search .......................... 219/93, 107, 91.2

(56) References Cited

U.S. PATENT DOCUMENTS 1,973,986 A * 9/1934 Kuhlman ..................... 219/93
2,897,391 A * 7/1959 Erskine ....................... 219/93
4,787,135 A * 11/1988 Nagahori ..................... 219/93
4,873,411 A * 10/1989 Saen et al. .................... 219/93
6,054,668 A * 4/2000 Van Otteren et al. ......... 219/93

* cited by examiner

*Primary Examiner*—Clifford C. Shaw
(74) *Attorney, Agent, or Firm*—Cantor Colburn LLP

(57) ABSTRACT

A method for resistance projecting welding the components of a current sensor is disclosed. The method comprises the steps of providing a first blade having a projection extending outward and a first conductor, supporting the first blade and the first conductor, positioning the first blade adjacent to the first conductor so that the projection of the first blade contacts an opposed surface on the first conductor defining a contact area, supplying an electrical current of a predetermined magnitude and predetermined duration to the first blade and the first conductor to create a weld at the contact area and continually applying a compressing force of a predetermined magnitude to the first blade throughout the supplying step to resistance projection weld the first blade and the first conductor at the contact area. The present method overcomes the drawbacks of the prior art by providing an alternative method to fabricate current sensors. Finally, the method reduces part production costs and increases part reliability while obtaining desired production rates.

32 Claims, 4 Drawing Sheets

METHOD OF RESISTANCE PROJECTION WELDING SENSORS

CROSS REFERENCE TO RELATED APPLICATIONS

This application is based upon, and claims the benefit of, U.S. Provisional Patent Application No. 60/189,530 filed on Mar. 15, 2000, which is herein incorporated by reference in its entirety.

BACKGROUND OF THE INVENTION

The present invention relates to the field of electric meters and, more particularly, to sensors utilized in metering devices.

Many electrical devices, such as electronic electric meters and induction or electronic type watt-hour meters for measuring electric power and usage, require current sensors for sensing the line current and producing an output signal related to the line current regardless of temperature.

Present sensor fabrication methods include electron beam welding of copper blades to nickel-copper resistors. While the prior art has been effective for many years, electron beam welding is not an economical means of fabricating sensors. Further, consistency of electron beam welding between different suppliers is difficult to maintain.

Previously, projection welding, and more specifically resistance projection welding, was not typically utilized when it was desired to bond a copper part to a copper nickel part. Copper traditionally does not withstand high pressures as is typically found with a projection welding. Further, when applying a projection welding technique to copper and copper alloy parts, the parts are heated to the liquid state. When the current ceases to flow through the parts, the parts can collapse while in the liquid state. Also, current sensors require consistent metallurgical bonding, as well as impedance consistency on each side of the conductors utilized within the current sensor. These characteristics are not attributable to projection welding due to the inconsistencies in the weld penetration.

SUMMARY OF THE INVENTION

The above discussed and other drawbacks and deficiencies are overcome or alleviated by the present invention.

In an exemplary embodiment of the present invention, a method for resistance projection welding the components of a current sensor is disclosed. The method comprises the steps of providing a first blade having a projection extending outward and a first conductor, supporting the first blade and the first conductor, positioning the first blade adjacent to the first conductor so that the projection of the first blade contacts an opposed surface on the second member defining a contact area, supplying an electrical current of a predetermined magnitude and predetermined duration to the first blade and the first conductor to create a weld at the contact area and continually applying a compressing force of a predetermined magnitude to the first blade throughout the supplying step to resistance projection weld the first blade and the first conductor at the contact area.

The above discussed and other features and advantages of the present invention will be appreciated and understood by those skilled in the art from the following drawings and detailed description.

BRIEF DESCRIPTION OF THE DRAWINGS

The present invention will now be described, by way of example, with reference to the following FIGURES, in which.

DETAILED DESCRIPTION OF THE INVENTION

Figure 1:
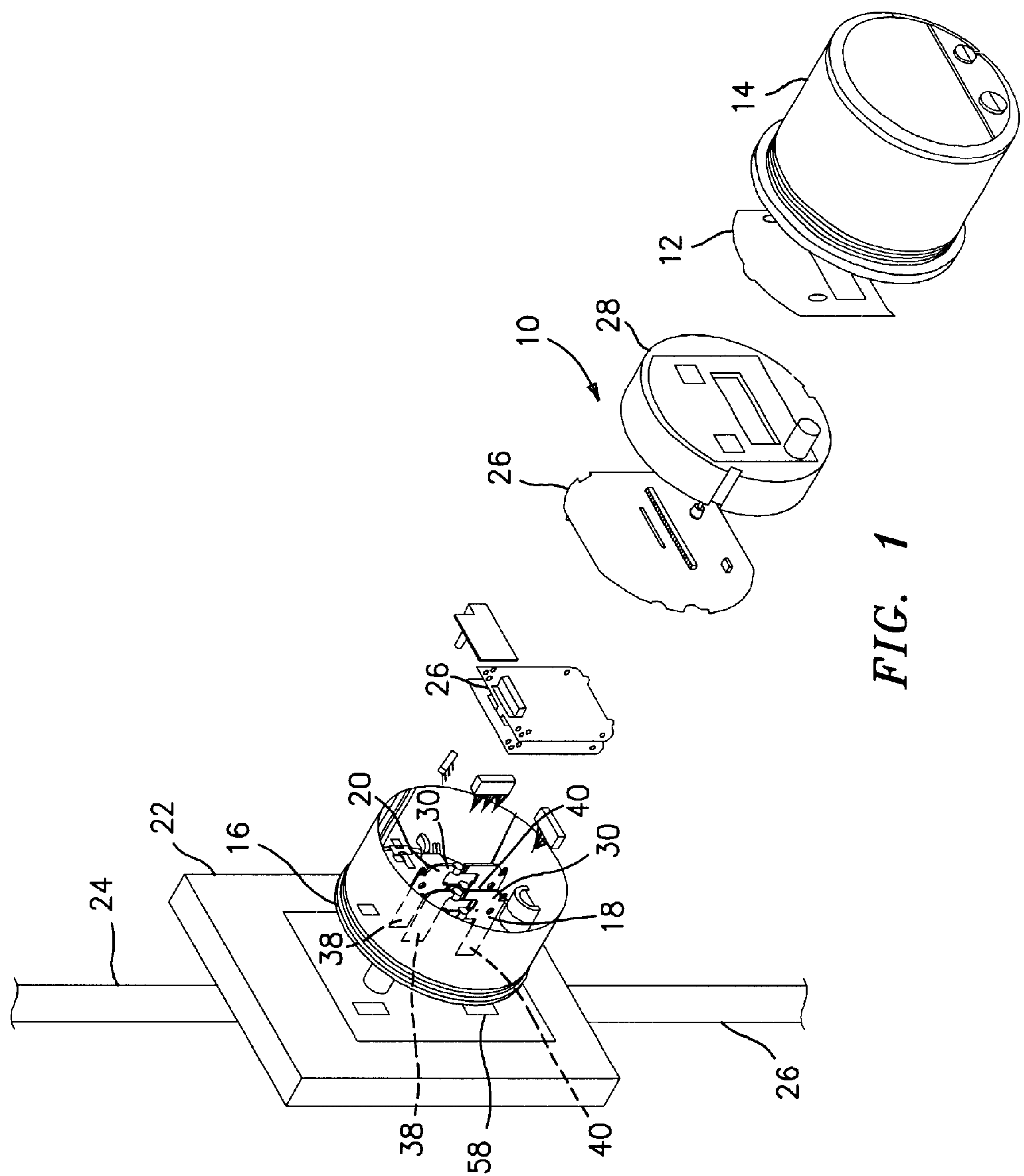
FIG. 1 is an isometric view of a meter assembly and current sensors manufactured according to the present invention.

Referring to FIG. 1, an electronic meter 10 for measuring electricity according to the present invention is shown. As would be readily understood by those skilled in the art, the meter 10 can measure watt-hours, var-hours, or other quantities. The meter 10 includes a cover 14, a base 16, a nameplate 12, a bezel 28, and circuit boards 26. The cover 14 attaches to the base 16 forming a housing to enclose the nameplate 12, bezel 28 and circuit boards, as is generally known in the art. The housing may have other shapes, such as generally rectangular as would also be readily understood by those skilled in the art.

The meter 10 also includes two current sensors 18, 20 positioned in side-by-side relation within the cover 14. The present invention however is not limited to a two current sensors but may be applied to other configurations, such as a three current sensors. Current sensors 18, 20 comprise an electrically conductive plate 30 having first and second blades 38, 40. First and second blades 38, 40 are preferably made of copper. First blade 38 functions as a line terminal and second blade 40 functions as a load terminal.

The meter 10 is connected to a panel 22 typically mounted on the exterior of a building. An incoming power cable 24 enters the panel 22. Panel 22 electrically connects the meter 10 to the incoming power cable 24 in order to measure the amount of electricity consumed. The meter 10 is electrically connected to the power cable 24 by insertion of the first and second blades 38, 40 through corresponding openings (not shown) within the base 16 and then into corresponding sockets 58 within the panel 22 as would be understood by those skilled in the art.

Figure 2:
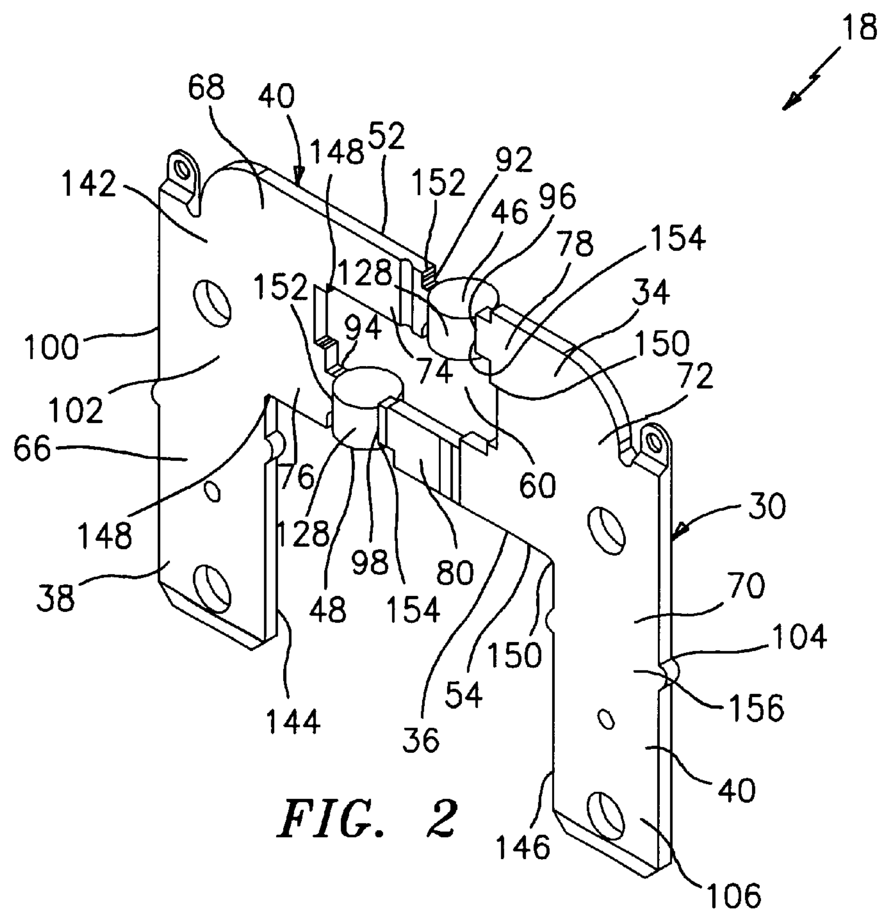
FIG. 2 is an isometric view of the current sensor of FIG. 1.
Figure 3:
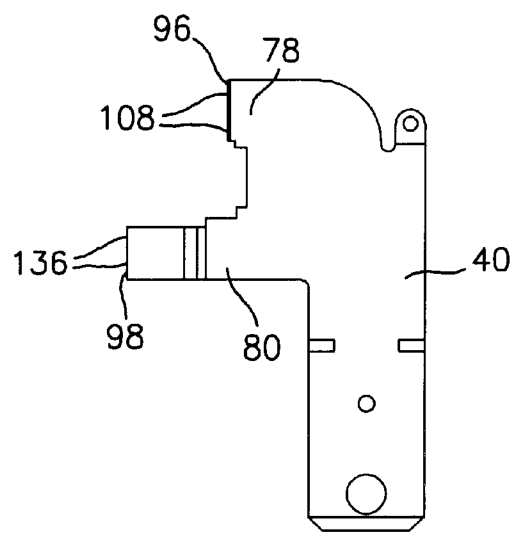
FIG. 3 is a front plan view of a first blade of the current sensor of FIG. 2 and projections.

Referring to FIGS. 2 and 3, the current sensor 18 located on the left side of the circular base 16 (FIG. 1) will now be described. However, it is understood by those skilled in the art that current sensor 20 includes similar elements.

First blade 38 includes a main body portion 142 having an outer edge 100 and an inner edge 144 with a flat surface 102 therebetween. A similar flat surface (not shown) opposes flat surface 102. Depending from the inner edge 144 of the main body portion 142 of the first blade 38 is a first arm 74 and a second arm 76. First arm 74 is substantially parallel to second arm 76. First and second arms 74, 76 each include a fixed end 148 continuous with the main body portion 142 and an unattached free end 152. The unattached free ends 152 of first and second arms 74, 76 of first blade 38 include edges 92, 94, respectively.

Second blade 40 includes a main body portion 156 having an outer edge 104 and an inner edge 146 with a flat surface 106 therebetween. A similar flat surface (not shown)

opposes flat surface 106. Depending from the inner edge 146 of the main body portion 156 of the second blade 40 is a first arm 78 and a second arm 80. First arm 78 is substantially parallel to second arm 80. First and second arms 78, 80 each include a fixed end 150 continuous with the main body portion 156 and an unattached free end 154. The unattached free ends 154 of first and second arms 78, 80 of second blade 40 include edges 96, 98, respectively.

First arm 78 of second blade 40 includes a projection 136 extending along edge 96 at the unattached free end 154. Second arm 80 of second blade 40 includes a projection 108 extending along edge 98 of the unattached free end 154. Preferably, projections 108, 136 are ninety degree angled projections. Projections 108, 136 are preferably produced using a stamping process.

In like manner but not shown, edges 92, 94 of first and second arms 74, 76 of the first blade 38 also include projections 108, 136, respectively.

Current sensor 18 also includes a first conductor 46 located between edge 94 of arm 76 and edge 98 of arm 80 and a second conductor 48 located between edge 92 of arm 74 and edge 96 of arm 78. First and second conductors 46, 48 are generally cylindrical shaped with an outer surface 128. First and second blades 38, 40 and first and second conductors 46, 48 define plate 30. First and second conductors 46, 48 are preferably made of a nickel and copper. Plate 30 includes an opening 60 in a medial portion thereof defining a first current branch 34 at an upper end 52 of plate 30 and a second current branch 36 at a lower end 42 of plate 30. First and second current branches 34, 36 conduct first and second portions of an input electrical current and are positioned adjacent opposing sides of opening 60. Preferably, first conductor 46 is a resistor having a predetermined resistance and second conductor 48 is a resistor having a predetermined resistance.

Figure 4:
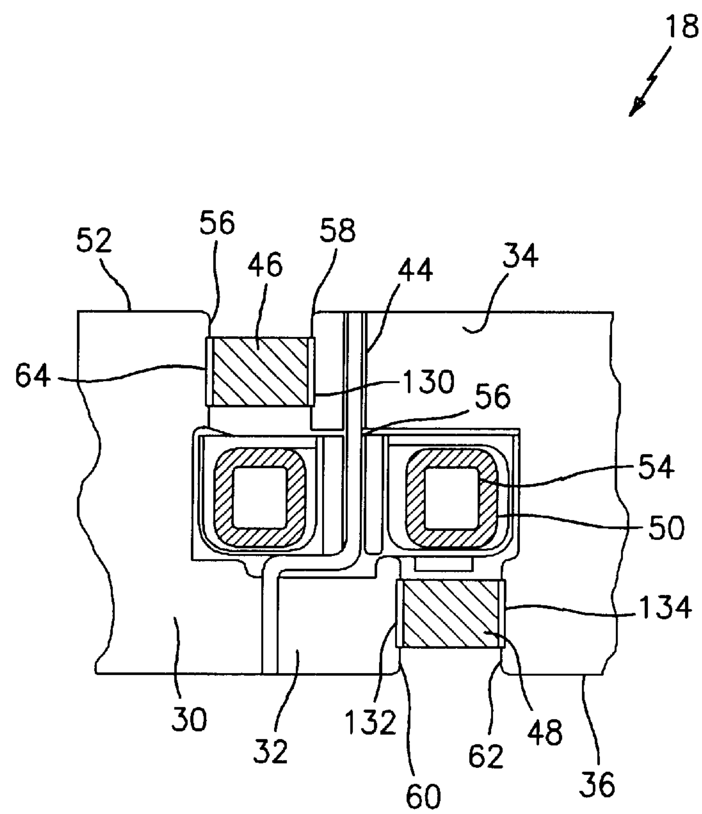
FIG. 4 is an enlarged cross section view of the current sensor of FIG. 2 showing the conductors and a current comparator.

Referring to FIG. 4, current sensor 18 includes a current comparator. Current comparator includes a coil 50 disposed around a core 54, for measuring electricity. An electrical conductor 44, preferably a resistor having a predetermined resistance, extends between the first and second current branches 32, 34 through a central opening 56 of the core 54. When current is passing through the conductor 44, the conductor 44 develops magnetic flux in the core 54, which, in turn, develops an electric output signal in the coil 50 that is proportional to the current flowing through the plate 30.

Figure 5:
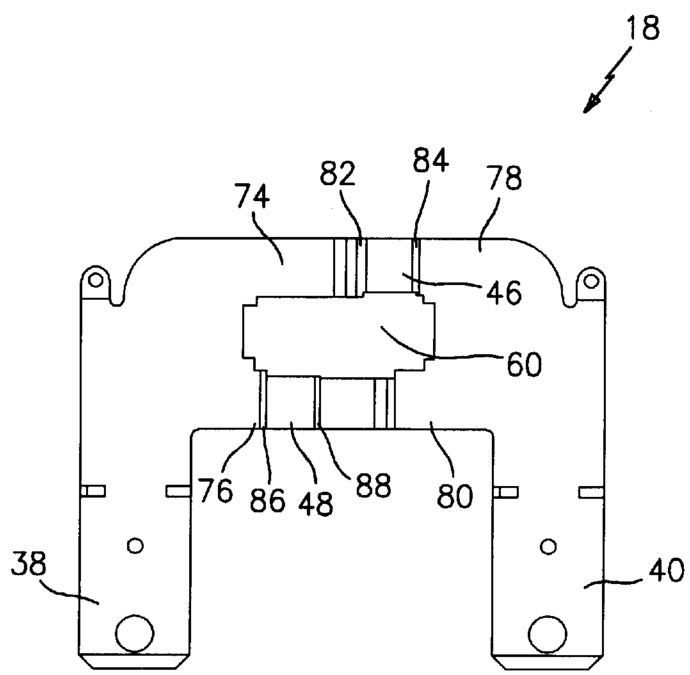
FIG. 5 is a side view of the current sensor of FIG. 2 showing welds.

Referring to FIG. 5, a cross-section view of the current sensor 18 is shown depicting welds 82, 84, 86, 88 on both sides of first and second conductors 46, 48, respectively. More specifically, the welds 82, 84, 86, 88 are located between edges 94, 98, 92, 96, respectively, and the adjacent sides of the first and second conductors 46, 48, respectively. Welds 82, 84 locate the first conductor 46 in the first current branch 34. Welds 86, 88 locate the second conductor 48 in the second current branch 36. In this way, first conductor 46 is integrated into the first current branch 34 and second conductor 48 is integrated into the second current branch 36.

Figure 6:
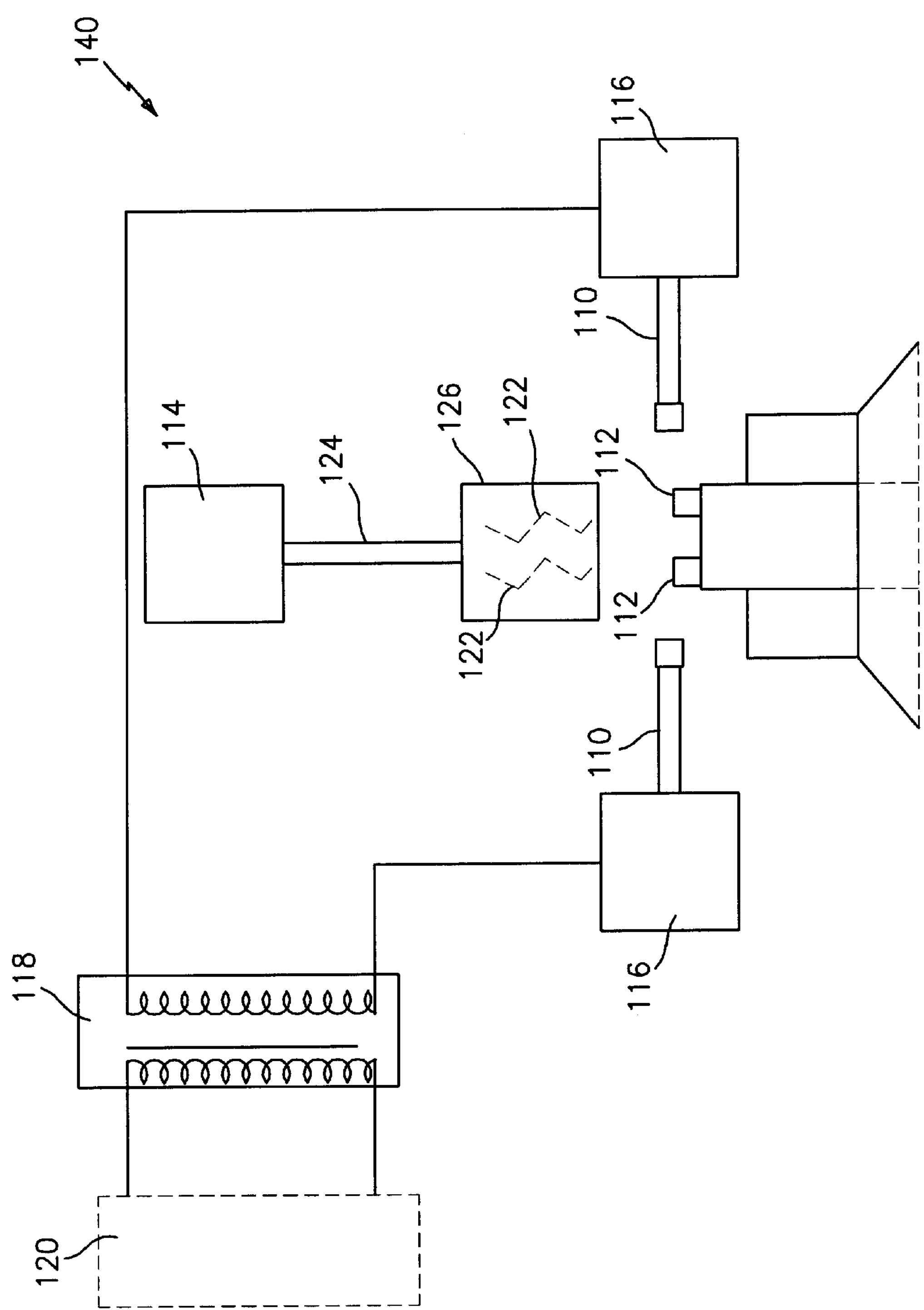
FIG. 6 is a side view of the resistance welding components employed for carrying out the present invention.

Referring to FIGS. 2, 5 and 6, a method for welding the first and second conductors 46, 46 will be detailed. First and second blades 38, 40 are welded to the first and second conductors 46, 48, respectively by use of a resistance projection welding method. FIG. 6 shows the resistance projection welding components employed in the following method. The first and second blades 38, 40 and first and second conductors 46, 48 are not shown.

First and second blades 38, 40 are placed in holding members 110, preferably gripping devices suitable to secure the flat surfaces 102, 106 of the first and second blades 38, 40, respectively. The holding members 110 are supported by a main body (not shown) of a welding apparatus, shown generally at 140, and maintain first and second blade 38, 40 alignment and restraint during the welding method. In particular, arms 74, 76, 78, 80 are restrained such that equal force can be applied to the projections along edges 92, 94, 96, 98, respectively. Holding members 110 also conduct the input electrical current to the first and second blades 38, 40 during the welding method.

The first and second conductors 46, 48 are then placed within respective die enclosures 112 that are located directly under the first and second blades 46, 48. Prior to welding, edges 94, 98 and corresponding projections 108 located along edges 94, 98 are positioned in opposing relation to each other and engage surface 128 of first conductor 46. Similarly, edges 92, 96 and corresponding projections 136 located along edges 92, 96 are positioned in opposing relation to each other and engage surface 128 of second conductor 48. The first and second conductors 46, 48 are fixedly positioned within the die enclosures 112 during the welding method.

First and second conductors 46, 48 are simultaneously welded to the first and second blades 38, 40 during one operation as described below.

An upper cylinder 114, preferably pneumatic, is movably connected to a rod 124 that is connected to a holding device 126. Upper cylinder 114 is lowered onto the flat surfaces 102, 106 of first and second blades 38, 40 and positioned adjacent to a first contact area 64, a second contact area 130, a third contact area 132 and a fourth contact area 134 as defined by the respective edges 92, 94, 96, 98 that engage the outer surfaces 128 of the respective first and second conductors 46, 48. The upper cylinder 114 applies a downward clamping force on the flat surfaces 102, 106 of the first and second blades 38, 40 of at least about 2000 pounds during the weld cycle. Two side cylinders 116, preferably pneumatic, are moved horizontally to engage outer edge 100 of first blade 38 and outer edge 104 of second blade 40. The side cylinders 116 provide a compressive force to the outer edges 100, 104 of the first and second blades 38, 40, respectively, of at least about 2000 pounds. Preferably, the compressive force applied by the side cylinders 116 is approximately about 3200 pounds to 3700 pounds for the duration of the weld cycle. The upper cylinder 114 ensures against buckling of the first and second blades 38, 40 under the application of the compressive forces applied by the side cylinders 116. The high compressive forces are required to ensure adequate conductivity at the weld interface to support the high current required to heat the first and second blades 38, 40 and thereby weld the first and second conductors 46, 48 between the respective edges 92, 94, 96, 98 of arms 74, 76, 78, 80.

The welding cycle is initiated by a high current that flows through the first and second iblades 38, 40 causing local heating at the interface with the first and second conductors 46, 48. The electrical current is applied to the first and second blades 38, 40 for only an extremely short duration, which duration is only about one-half to about one of an alternating current wave cycle. For a one cycle weld time, a high voltage of approximately about 20 volts alternating current (vac) corresponding to a 63 kilo ampere (kA) input current level for approximately about one sixtieth of a second (weld cycle) is initiated by a transformer 118. For a one-half cycle weld time, a high voltage of approximately about 20 vac corresponding to an 80 kA input current level for approximately about one twentieth of a second (weld cycle) is initiated by the transformer 118. Transformer 118, as shown in FIG. 6, is electrically connected to a fixture (not shown) that is actuated by side cylinders 116. The power supply to the transformer 118, and hence the welding current and its duration supplied thereto to the holding members 110, is controlled by a control unit 120.

Since the high level of input current is supplied in very short time duration, it is necessary to collapse the projections 108, 136 (FIG. 3) before the first and second blades 38, 40 and first and second conductors 46, 48 collapses due to prolonged exposure to high temperatures created by the current flow. This is achieved by the use of spring assemblies 122 that are mounted to holding device 126 and act to rapidly remove the compressive forces from the first and second blades 38, 40 once the predetermined weld cycle is complete. Spring assemblies 122 are continuously biased for rapid follow-up movement once the projections 108, 136 collapse. The spring assemblies 122 significantly lower the moving mass of the holding device 126 during projection collapse from about 300 pounds to less than about 10 pounds. This permits the weld cycle to be reduced to one-half cycle while maintaining the necessary forces exerted on the first and second blades 38, 40 and consequently, on the first and second conductors 46, 48 during the short duration weld cycle.

The welds 82, 84, 86, 88 are completed by the application of high compressive forces exerted on the first and second blades 38, 40 by the side cylinders 116. The application of the compressive forces coupled with the heating of the projections 108, 136 (FIG. 3) as well as the first and second blades 38, 40 in the immediate vicinity of the projection, effect the collapse of the heated projections 108 (FIG. 3) to thereby create welds 82, 84, 86, 88. The method produces welds 82, 84, 86, 88 that have a weld (joint) strength to be able to withstand handling, meter assembly and testing. The welds 82, 84, 86, 88 have tensile strengths equivalent to that of copper nickel. The welds 82, 84, 86, 88 also do not exhibit severe expulsion as this can cause unwanted debris during meter assembly. The resistance projection welding method employs the necessary high forces to support the high current that is required to effect the welding of the first and second conductors 46, 48 to the first and second blades 38, 40. Further, the application of high pressure from the upper cylinder 114 and the side cylinders 116 in a short duration ensures minimum weld penetration as the weld heat effected zone does not penetrate through the first and second blades 38, 40. Homogenous properties within the first and second conductors 38, 40 are achieved.

At the conclusion of the welding method as described hereinabove, the current sensor 18 is held in place until welds 82, 84, 86, 88 are cooled. The upper cylinder 114 retracts, the side cylinders 116 retract and the current sensor 18 is removed from the holding members 110 and the die enclosures 12.

The method disclosed herein advantageously employs a resistance projection welding method to bond first and second conductors 46, 48 to first and second blades 36, 38, 40 of current sensor 18. Resistance projection welding for current sensor 18 provides an inexpensive and reliable method as compared electron beam welding, to simultaneously weld the first and second conductors 46, 48 into the first and second current branches 36, 38, respectively. To effect the bond using a resistance projection welding method, a high voltage source is required to yield a high current sufficient to effect the welding at the interfaces of the first and second conductors 46, 48 to the first and second blades 38, 40. High conductivity is required at the interfaces to maintain contact during the welding method. To support the high current flowing through the first and second current branches 34, 36, the high clamping force is applied from the upper cylinder 114 proximate to the first and second conductors 46, 48. Potential buckling of the first and second blades 38, 40 under the high compressive forces exerted by the two side cylinders 116 is thus averted while ensuring weld integrity.

The restraint of the first and second conductors 46, 48, as well as the first and second blades 38, 40, during the welding method ensures that the mechanisms behind the projection collapse are controlled properly and the local forging characteristics of the cooper at the bond lines are not compromised. In this way, small variances between the welds 82, 84, 86, 88 at the bondline have large effects on the repeatability of current sensor 18 thermal response.

The method described herein above welds the first and second conductors 46, 48, made of nickel and copper, to first and second blades 36, that are made of copper, respectively. The resistance for the first and second current branches 34, 36 are equal thus ensuring impedance consistency and proper sensor performance. This is accomplished by producing welds 82, 84, 86, 88 using a high pressure, short cycle resistance projection welding method. The resistance projection welding method produces welds 82, 84, 86, 88 at a lower cost than traditional electron beam welding and has the necessary quality and reliability comparable to welds produced with traditional welding methods. By developing a resistance projection welding method for use in manufacturing a current sensor 18, desired production rates are achieved, part fabrication costs are substantially reduced and sensor performance is consistent and reliable during production. Finally, joint strength is great enough to withstand handling, meter assembly and testing.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for assembling an electrical sensor, the electrical sensor including a first blade including first and second projections, and first and second conductors, the method comprising the steps of:

positioning the first blade adjacent to the first conductor so that the first projection of the first blade contacts an opposed outer surface on the first conductor defining a first contact area;

positioning the first blade adjacent to the second conductor so that the second projection of the first blade contacts the opposed outer surface on the second conductor defining a second contact area;

supplying an electrical current of a predetermined magnitude and predetermined duration through the first blade and the first and second conductors; and forcing the first blade toward the first and second conductors during the supplying step to resistance projection weld the first blade and the first conductor at the first contact area and to resistance projection weld the first blade and the second conductor at the second contact area.

2. The method of claim 1 wherein the forcing step comprises:

applying a compressing force of a predetermined magnitude to an outer edge of the first blade pressing the first blade against the first and second conductors;

applying a compressing force of a predetermined magnitude to a flat surface of the first blade to maintain the positioning of the first blade and the first and second conductors.

3. The method of claim 2 wherein the compressing force to the outer edge of the first blade is at least about 2000 pounds.

4. The method of claim 2 wherein the compressing force to the flat surface of the first blade is at least about 2000 pounds.

5. The method of claim 1 wherein the electrical current is supplied at about 20 vac.

6. The method of claim 1 wherein the predetermined duration is one half of an alternating current wave cycle.

7. The method of claim 1 wherein the electrical current is supplied at about 20 vac.

8. The method of claim 1 wherein the predetermined duration is one alternating current wave cycle.

9. The method of claim 1 wherein the first blade is made of copper.

10. The method of claim 1 wherein the first and second conductors are resistors of a predetermined resistance and are made of a material including copper and nickel.

11. The method of claim 1 wherein the first blade includes a main body portion having an inner edge opposite the outer edge of the first blade and a first arm depending from the inner edge of the main body portion of the first blade, the first arm having a fixed end adjacent the main body portion and an unattached free end, the first projection of the first blade located along an edge of the unattached free end.

12. The method of claim 11 wherein the first projection of the first arm of the first blade is angled at about ninety degrees.

13. The method of claim 1, wherein the electrical sensor further includes a second blade including first and second projections, the method further including:

positioning the second blade adjacent to the first conductor so that the first projection of the second blade contacts the opposed outer surface on the first conductor defining a third contact area;

positioning the second blade adjacent to the second conductor so that the second projection of the second blade contacts the outer surface on the second conductor defining a fourth contact area;

supplying the electrical current through the first and second blades and the first and second conductors; and forcing the second blade toward the first and second conductors during the supplying step to resistance projection weld the second blade and the first conductor at the third contact area and to resistance projection weld the second blade and the second conductor at the fourth contact area.

14. The method of claim 13 wherein forcing the second blade comprises:

continually applying a compressing force of a predetermined magnitude to an outer edge of the second blade pressing the second blade against the outer surface of the first and second conductors; and continually applying a compressing force of a predetermined magnitude to a flat surface of the second blade to maintain the positioning of the second blade and the first conductor.

15. The method of claim 14 wherein the compressing force to the outer edge of the second blade is at least about 2000 pounds.

16. The method of claim 14 wherein the compressing force to the flat surface of the second blade is at least about 2000 pounds.

17. The method of claim 13 wherein the second blade is made of copper.

18. The method of claim 13 wherein the second blade includes a main body portion having an inner edge opposite the outer edge of the second blade and a first arm depending from the inner edge of the main body portion of the second blade, the first arm of the second blade having a fixed end adjacent the main body portion of the second blade and an unattached free end, the first projection of the second blade located along an edge of the unattached free end.

19. The method of claim 18 wherein the first projection of the first arm of the second blade is angled at about ninety degrees.

20. The method of claim, 13 wherein the first blade further includes a second arm depending from the inner edge of the main body portion of the first blade, the second arm substantially parallel to the first arm of the first blade, the second arm of the first blade having a fixed end adjacent the main body portion and an unattached free end, the second projection of the first blade located along an edge of the unattached free end of the second arm of the first blade.

21. The method of claim 20 here the second projection of the second arm of the second blade is angled at about ninety degrees.

22. A method for assembling an electrical sensor, the electrical sensor including a first blade including a first projection, a second blade including a first projection, and a first conductor, the method comprising the steps of:

positioning the first blade adjacent to the first conductor so that the first projection of the first blade contacts an opposed outer surface on the first conductor defining a first contact area;

positioning the second blade adjacent to the first conductor so that the first projection of the second blade contacts the opposed outer surface on the first conductor defining a second contact area;

supplying an electrical current of a predetermined magnitude and predetermined duration through the first blade, the second blade, and the first conductor; and forcing the first blade and the second blade toward the first conductor during the supplying step to resistance projection weld the first blade and the first conductor at the first contact area and to resistance projection weld the second blade and the first conductor at the second contact area.

23. The method of claim 22 wherein the forcing step comprises:

applying a compressing force of a predetermined magnitude to an outer edge of the first blade pressing the first blade against the outer surface of the first conductor;

applying a compressing force of a predetermined magnitude to a flat surface of the first blade to maintain the positioning of the first blade and the first conductor;

applying a compressing force of a predetermined magnitude to an outer edge of the second blade pressing the second blade against the outer surface of the first conductor; and applying a compressing force of a predetermined magnitude to a flat surface of the second blade to maintain the positioning of the second blade and the first conductor.

24. The method of claim 22 wherein the first blade and the second blade are made of copper.

25. The method of claim 24 wherein the first conductor is a resistor of a predetermined resistance and made of a material including copper and nickel.

26. A method for assembling an electrical sensor, the method including:

providing a load terminal including a first projection and a second projection extending therefrom;

providing a line terminal including a first projection and a second projection extending therefrom;

supporting a first resistor between the first projection of the load terminal and the first projection of the line terminal;

supporting a second resistor between the second projection of the load terminal and the second projection of the line terminal; and applying an electrical current through the load terminal, the first and second resistors, and the line terminal while forcing the first projections against the first resistor and while forcing the second projections against the second resistor to resistance projection weld the load and line terminals to the first and second resistors.

27. The method of claim 26, further including:

electrically connecting a current comparator between the load and line terminals.

28. The method of claim 27, wherein the load terminal includes a first arm extending therefrom, the first projection of the load terminal extends from the first arm of the load terminal, and the line terminal includes a first arm extending therefrom, the second projection of the line terminal extends from the first arm of the line terminal, and wherein electrically connecting the current comparator includes:

disposing a core between the first arm of the load terminal and the first arm of the line terminal;

positioning a resistor within a central opening in the core;

attaching one end of the resistor to the first arm of the load terminal; and attaching another end of the resistor to the first arm of the line terminal.

29. The method of claim 26, wherein forcing the first projection of the load terminal against the first resistor and forcing the second projection of the load terminal against the second resistor is accomplished with a force of at least about 2000 pounds.

30. The method of claim 29, wherein forcing the first projection of the load terminal against the first resistor and forcing the second projection of the load terminal against the second resistor is accomplished with a force of between about 3200 pounds to about 3700 pounds.

31. The method of claim 26 wherein forcing the first projection of the load terminal against the first resistor and forcing the second projection of the load terminal against the second resistor is accomplished with a force applied to an outer edge of the load terminal; and wherein the method further comprises:

clamping the load terminal with a force normal to the force applied to the outer edge of the load terminal.

32. The method of claim 26, wherein the electrical current is applied for a duration of between about one-half of an alternating current wave cycle to about one alternating current wave cycle.

* * * * *